Nov. 21, 1950     A. JOHNSON     2,531,274
SAFETY CHECK VALVE FOR HYDRAULIC SYSTEMS
Filed Aug. 7, 1948     2 Sheets—Sheet 1
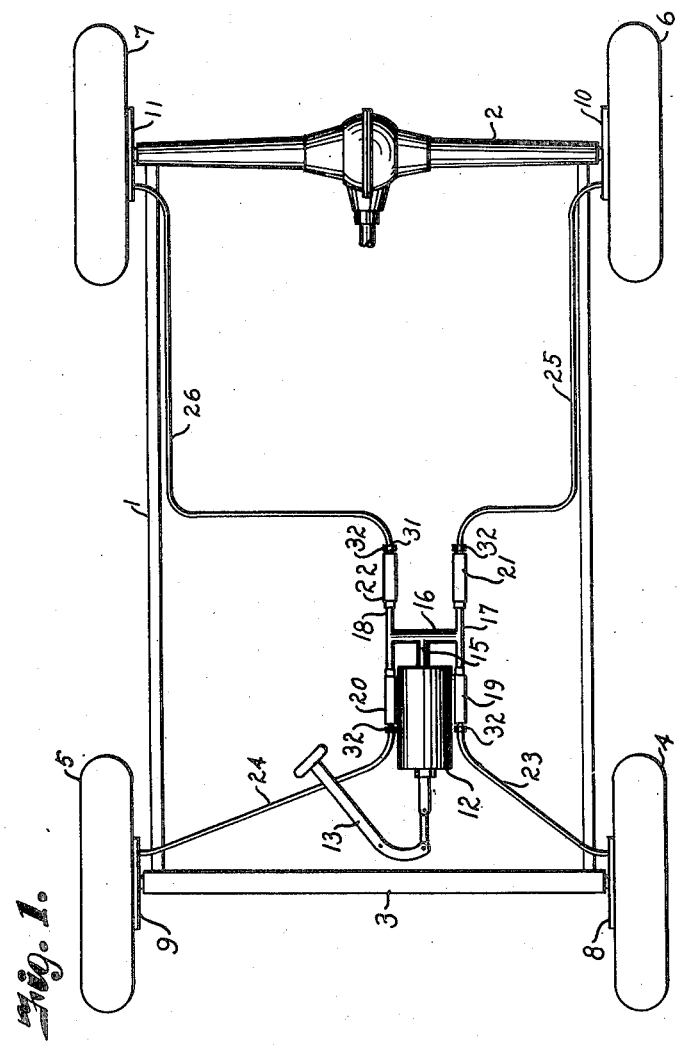
Inventor
ARVEN JOHNSON
By Fishburn & Mullendore
Attorneys Nov. 21, 1950  A. JOHNSON  2,531,274
SAFETY CHECK VALVE FOR HYDRAULIC SYSTEMS
Filed Aug. 7, 1948  2 Sheets-Sheet 2
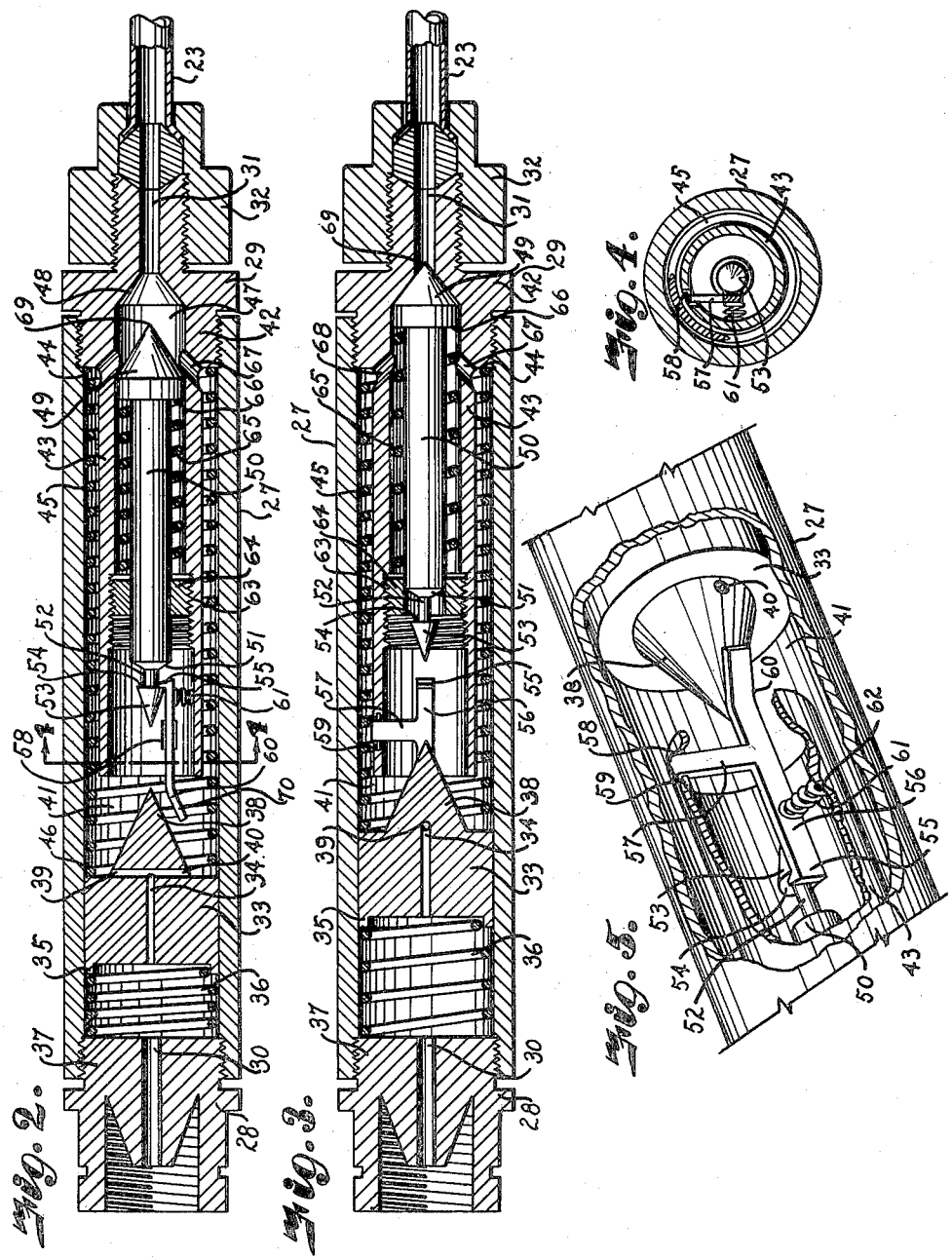
Inventor
ARVEN JOHNSON
By Fishburn & Mullendore
Attorneys Patented Nov. 21, 1950

2,531,274

UNITED STATES PATENT OFFICE 2,531,274

SAFETY CHECK VALVE FOR HYDRAULIC SYSTEMS

Arven Johnson, Kansas City, Mo.

Application August 7, 1948, Serial No. 43,025

8 Claims. (Cl. 303—84)

This invention relates to fluid pressure systems, and more particularly to a safety check valve assembly for use in such systems to check loss of fluid in the event of a leak or break.

The invention is particularly adapted for use in hydraulic brake systems for automotive vehicles and the like, and heretofore in use on such systems frequently line failures occur between the cylinder directly associated with the brake shoe and the master cylinder rendering the entire system useless.

The principal object of the present invention is to provide a valve assembly in the lines leading from the master cylinder to the brake shoe so that when a leak occurs in such line the valve will shut off the fluid to the line so that the remaining brakes of the vehicle will be effective for stopping the vehicle.

Other objects of the present invention are to provide a check valve assembly in one or more of the fluid lines of a hydraulic brake system so that at least two brakes in a four-wheel brake system will be effective upon line failure; to provide a check valve assembly for use in fluid pressure systems in which the valve will be open only during existence of normal operating pressure in such system; to provide means in the valve assembly for stopping fluid through a line should a leak occur in said line; to provide a new and improved check valve assembly for a fluid pressure system of the continuous pressure type in the event of a leak or a break in such systems; to provide a valve assembly wherein the valve may be easily and quickly reset after repair of the leak in the line in the system; and to provide a system of this character economical to manufacture and efficient in operation.

In accomplishing these and other objects of the present invention, I have provided improved details of structure, the preferred forms of which are illustrated in the accompanying drawings wherein:

Fig. 1 illustrates diagrammatically a vehicle chassis with the present invention shown thereon.

Fig. 2 is an elevational sectional view through one of the valves showing the system open for fluid passage therethrough.

Fig. 3 is a view similar to Fig. 2 showing the valve assembly in closed position.

Fig. 4 is a transverse cross section taken on a line 4—4 (Fig. 2).

Fig. 5 is an elevational view of the lock assembly of the device since mounting in the valve.

Referring more in detail to the drawings:

Referring to Fig. 1 of the drawings, 1 designates a frame of a motor vehicle chassis having a rear axle 2, front axle 3, front wheels 4 and 5 and rear wheels 6 and 7 equipped with drums 8, 9, 10 and 11. 12 designates a master cylinder of a fluid braking system to which is connected the usual foot braking pedal 13. A line 15 leads from the master cylinder and is provided with a branch line 16 connected to lines 17 and 18 to which are connected valves 19, 20, 21 and 22 embodying the features of the present invention having their opposite ends connected to lines 23 and 24 leading to the front brake drums 8 and 9 and lines 25 and 26 leading to the rear brake drums 10 and 11.

While I have here illustrated four of the valve assemblies, one in each of the lines leading to the brake drums, it will be obvious that a lesser number may be used, for instance, two, one connecting the lines leading to the front brake shoes and one leading to the rear brake shoes. The valve assemblies are identical and only one therefore will be described in detail.

The valve comprises a main housing 27 having its respective ends internally threaded for receiving threaded connections or plugs 28 and 29. The connection 28 is in the inlet end of the housing and is provided with an opening 30 for inlet of fluid to the housing or cylinder and the connection 29 is provided with a discharge opening 31. The inlet connection represents the upstream side of the valve assembly and the discharge end is referred as the downstream side, and the downstream end of the cylinder being connected to the line 23, 24, 25, and 26 as indicated in Fig. 1 and the upstream side connected to the lines 17 and 18 leading from the master cylinder 12. Suitable connections 32 are provided on the downstream end of the valve for connection to the lines leading to the brake drums.

A piston 33 having an opening 34 therethrough is provided near the upstream or inlet end of the cylinder 27 and the outer end is provided with an annular flange 35 in which is adapted to engage one end of a compression spring 36, the opposite end engaging against the end 37 of the connection 28. The piston 33 is provided with a cone-shaped member 38 on its inner end having openings 39 and 40 connecting with the opening 34 in the piston to allow fluid to pass through the piston to the chamber 41 of the cylinder housing. It will be noted that the opening 30 through which the fluid passes is larger than the opening 39 and 40 in the cone-shaped member 38 so that greater pressure will be exerted on the liquid by pressure thereon against the face of the piston 33 than would otherwise be provided through a straight-way flow through the piston.

The connection 29 in the downstream side of the housing is provided with a bushing end 42 having a cylindrical sleeve member 43 which extends a substantial distance into the chamber 41 of the housing 27. The bushing 42 of the connection 29 is provided with a cylindrical shoulder 44 against which one end of a compression spring 45 engages and has its opposite end engaging against the inner end of the piston 33 as indicated at 46 (Fig. 2) the compression spring surrounding the cylindrical sleeve member 43.

The connection 29 is provided with a chamber 47 which connects with the discharge outlet 31 on the downstream side of the valve and is provided with a seat 48 for the valve 49 provided on the end of a stem 50 located within the sleeve member 43. The end of the stem 50 opposite from the valve 49 is cut away as indicated at 51 to provide a stem 52 of smaller diameter than the main valve stem and the outer end of the stem 52 is provided with a cone-shaped member 53 having a shoulder 54 adapted to be engaged by a hook 55 on the end of a lever 56 having a lateral arm 57 pivoted in a groove 58 in the cylindrical sleeve 43 by a pin 59 as best illustrated in Fig. 5. The outer end of the lever is curved as indicated at 60 at substantially the same angle as the cone-shaped member 38 on the piston 33. A coil spring 61 is provided for engaging against the wall of a sleeve member 43 as indicated at 62 and its opposite end against the side of the lever 56 as indicated at 62 to resiliently urge the hook member in engagement with the shoulder of the cone-shaped member 53.

The inside of the cylindrical sleeve 43 is provided with threads as indicated at 63 adapted to receive a hollow threaded bushing 64 through which the stem 50 of the valve extends as best illustrated in Fig. 2. A compression spring 65 surrounds the stem 50 of the valve and has one end engaging against the shoulder 66 of the cone-shaped valve 49 and its opposite end against the threaded bushing 60 which tends to urge the valve 49 against the seat 48 when the hook 55 is disengaged from the shoulder 54 of the cone-shaped member 53 as will later be referred to. Openings 67 and 68 are provided in the bushing end 42 of the connection 29 which leads from the chamber 47 to the chamber 41 between the housing 27 and sleeve 43.

Operation of a valve constructed and assembled in a fluid braking system as described is as follows:

In normal operation of the braking system, operation of the foot lever 13 will cause fluid to pass from the master cylinder 12 through lines 15, 16 and branch lines 17 and 18 to the respective valve assemblies and will enter the valve assemblies through the opening 30 in the connection 28 and exert pressure on the piston 33 due to the opening 30 being larger than the opening 34. This pressure will not be great enough, however, to cause the cone-shaped member 38 on the piston to engage the lever 56. Fluid passes through the opening 39 and 40 in the piston to the chamber 41 and through openings 67 and 68 to the chamber 47 in the connection 29 on the outlet end or downstream side of the valve chamber and through the opening 31 and through lines 23, 24, 25, and 26 to the brake shoes of the vehicle. This is the normal operation of the system, and in this operation the valve mechanism is open and positioned as shown in Fig. 2.

In order to cause the valve assembly to assume the position shown in Fig. 2, the connection 32 is removed from the line tube leading to the brake shoes and a tool such as a wire or the like (not shown) is inserted through the opening 31 to engage the point 69 of the valve to move the valve in the chamber 41 until the hook 55 of the lever 56 engages the shoulder 54 of the cone-shaped member 53. The braking system will operate in the usual manner with the device in this position.

Should a leak occur in any of the lines 23, 24, 25 and 26, the piston will move in the housing due to the release of the fluid pressure until the cone-shaped member 38 engages the lever 56 at the point as indicated at 70, causing the lever to pivot on its pivot point and disengage the hook member from the plunger of the valve. The compression spring 65 causes the valve to move toward the discharge or downstream end until it seats on the valve seat 48 to close the opening 31 to the line. When this occurs, flow of fluid will stop to that line and the remaining three brakes will be effective. Leaks in a line may be repaired by disengaging the connections 32, and the valve 49 with its stem 50 again placed in the position as shown in Fig. 2 by movement of the plunger with the tool as set out above so that the device will again be ready for operation.

It will be obvious that from the foregoing I have provided an improved safety check valve assembly for fluid pressure system effective for checking the flow should a leak occur in any of the lines comprising the system. Should a leak occur in one or more of the lines simultaneously, the remaining lines will still be effective for braking the vehicle.

What I claim and desire to secure by Letters Patent is:

1. A safety check valve assembly for use in hydraulic systems comprising, a housing having inlet and discharge ends, plug connections in the respective ends of said housing forming a chamber in the housing, said plugs being provided with openings leading to said chamber, a piston in the inlet end of said housing, said piston having an opening therein permitting passage of fluid therethrough, said piston being movable in the housing in response to fluid pressure differential on the inlet side thereof the plug connection in the discharge end of said housing having a fluid chamber and a seat connecting with the opening in the discharge end of the housing and a cylindrical sleeve extending into the housing chamber, a valve resiliently mounted in said sleeve for engaging said seat and having a stem, an annular recess on the inner end of the stem having a shoulder, means including a lever pivotally mounted on said sleeve having a hook for engaging said shoulder, and means on the piston in the inlet end of the housing responsive to fluid pressure differential on the inlet side thereof for disengaging said hook to permit said valve to close.

2. A safety check valve assembly for use in hydraulic systems comprising, a housing having inlet and discharge ends, plug connections in the respective ends of said housing forming a chamber in the housing, said plug connections being provided with openings leading to said chamber, a piston in the inlet end of said housing, said piston having an opening therein permitting passage of fluid therethrough, said piston being movable in the housing in response to fluid pressure differential on the inlet side thereof the plug connection in the discharge end of said housing having a fluid chamber and a seat connecting with the opening in the discharge end of the housing, a cylindrical sleeve on said plug connection in the discharge end extending into said chamber having a space between said sleeve and said housing, said sleeve having openings leading from the chamber in the plug to the space between said sleeve and said housing, a valve slidably mounted in said sleeve for engaging said seat and having a stem, means for retaining said valve away from said seat, a compression spring between said piston and the plug connection in the inlet end of said housing, and means on said last named piston engaging said valve retaining means for disengaging said valve retaining means, and resilient means in the sleeve for urging said valve into engagement with said seat.

3. A safety check valve assembly for use in hydraulic systems comprising, a housing having inlet and discharge ends, plug connections in the respective ends of said housing forming a chamber in the housing, said plug connections being provided with openings leading to said chamber, a piston in the inlet end of said housing, said piston having an opening therein permitting passage of fluid therethrough, said piston being movable in the housing in response to fluid pressure differential on the inlet side thereof, a compression spring in said housing between the outer end of said piston and the inlet plug connection, the plug connection in the discharge end of said housing having a fluid chamber and a valve seat connecting with the opening in the discharge end of the housing, a cylindrical sleeve on said plug connection in the discharge end extending into said chamber providing a space between said sleeve and said housing, said sleeve having openings leading from the chamber in the plug to the space between said sleeve and said housing, a valve resiliently mounted in said sleeve for engaging said seat and having a stem, a shoulder on the end of the stem opposite said valve, means engaging said shoulder for retaining the valve off said seat, and means movable with the piston in the inlet end of the housing for disengaging said shoulder engaging means to permit said valve to move into engagement with said seat.

4. A safety check valve assembly for use in hydraulic systems comprising, a housing having inlet and discharge ends, plug connections having openings longitudinally thereof for engagement in said ends and forming a chamber within said housing, a piston having an opening longitudinally thereof in said inlet end of the housing, the plug connection in the discharge end of the housing having a fluid chamber and a valve seat, a cylindrical sleeve integral with said discharge end connection and extending a substantial distance inwardly of said housing chamber forming a space between said sleeve and said housing, a compression spring having one end engaging said plug connection in the discharge end of the housing and its opposite ends engaging against said piston, a compression spring between the opposite end of said piston and said plug connection in the inlet end of said housing, a bushing having an opening therein screw threadedly engaging in said sleeve, a valve having a stem engaging through said bushing, a compression spring surrounding said stem having one end engaging against said valve, its other end against said bushing to normally retain the valve on said seat, means for retaining said valve off said seat, means for supplying fluid to said housing, and means for disengaging said valve retaining means when the pressure on the downstream side of said valve is released so the valve will engage said seat.

5. A safety check valve assembly for use in hydraulic systems comprising, a housing having inlet and discharge ends, plug connections having openings longitudinally thereof for engagement in said ends and forming a chamber within said housing, a piston having an opening longitudinally thereof in said inlet end of the housing, the plug connection in the discharge end of the housing having a fluid chamber and a valve seat, a cylindrical sleeve integral with said discharge end plug connection and extending a substantial distance inwardly of said housing chamber forming a space between said sleeve and said housing, a compression spring having one end engaging said plug connection in the discharge end of the housing and its opposite ends engaging against said piston, a compression spring between the opposite ends of said piston and said plug connection in the inlet end of said housing, a bushing having an opening therein screw threadedly engaging in said sleeve, a valve having a stem threadedly engaging in said sleeve, a valve having a stem engaging through said bushing, a compression spring surrounding said stem having one end engaging against said valve and its other end against said bushing to normally retain the valve on said seat, said valve stem having a cone-shaped member on its inner end, a lever pivotally mounted in said sleeve and having a hook engaging the said cone-shaped member on the valve stem for retaining said valve off said seat, and means for supplying fluid to said housing, whereby said piston will be moved forwardly on said housing to disengage said hook from said valve stem when the pressure on the downstream side of said valve is released so the valve will engage said seat.

6. A safety check valve assembly for use in hydraulic systems comprising, a housing having inlet and discharge ends, plug connections having openings longitudinally thereof for engagement in said ends and forming a chamber within said housing, a piston having an opening longitudinally thereof in said inlet end of the housing, the plug connection in the discharge end of the housing having a fluid chamber and a valve seat, a cylindrical sleeve extending a substantial distance inwardly of said housing chamber at the discharge end forming a space between said sleeve and said housing, a compression spring having one end engaging said plug connection in the discharge end of the housing and its opposite ends engaging against said piston, a compression spring between the opposite ends of said piston and said plug connection in the inlet end of said housing, a bushing having an opening therein screw threadedly engaging in said sleeve, a valve having a stem engaging through said bushing, a compression spring surrounding said stem having one end engaging against said valve and its other end against said bushing to normally retain the valve on said seat, said valve stem having a cone-shaped member on its inner end, a lever pivotally mounted in said sleeve and having a hook engaging the said cone-shaped member on the valve stem for retaining said valve off said seat, and means for supplying fluid to said housing, whereby said piston will be moved forwardly in said housing to disengage said hook from said valve stem when the pressure on the downstream side of said valve is released so the valve will engage said seat.

7. A safety check valve assembly for use in hydraulic systems comprising, a housing having inlet and discharge ends, plug connections having openings longitudinally thereof for engagement in said ends and forming a chamber within said housing, a piston having an opening longitudinally thereof in said inlet end of the housing, the plug connection in the discharge end of the housing having a fluid chamber and a valve seat, a cylindrical sleeve integral with said discharge end plug connection and extending a substantial distance inwardly of said housing chamber forming a space between said sleeve and said housing, a compression spring having one end engaging said plug connection in the discharge end of the housing and its opposite ends engaging against said piston, a compression spring between the opposite end of said piston and said plug connection in the inlet end of said housing, a bushing having an opening therein screw threadedly engaging in said sleeve, a valve having a stem engaging through said bushing, a compression spring surrounding said stem having one end engaging against said valve and its other end against said bushing to normally retain the valve on said seat, said valve stem having a cone-shaped member on its inner end, a lever pivotally mounted in said sleeve and having a hook engaging the said cone-shaped member on the valve stem for retaining said valve off said seat, and means for supplying fluid to said housing, said piston having a cone-shaped member on its inner end engaging said lever to disengage said hook to close said valve when pressure on the downstream side of said valve is released.

8. A safety check valve assembly for use in hydraulic systems comprising, a housing having inlet and discharge ends, plug connections having openings longitudinally thereof for engagement in said ends and forming a chamber within said housing, a piston having an opening longitudinally thereof in said inlet end of the housing, the plug connection in the discharge end of the housing having a fluid chamber and a valve seat, a cylindrical sleeve integral with said discharge end plug connection and extending a substantial distance inwardly of said housing chamber forming a space between said sleeve and said housing, a compression spring having one end engaging said plug connection in the discharge end of the housing and its opposite ends engaging against said piston, a compression spring between the opposite end of said piston and said plug connection in the inlet end of said housing, a bushing having an opening therein screw threadedly engaging in said sleeve, a valve having a stem engaging through said bushing, a compression spring surrounding said stem having one end engaging against said valve and its other end against said bushing to normally retain the valve on said seat, said valve stem having a cone-shaped member on its inner end, a lever having a lateral arm pivotally mounted in said sleeve and having a hook engaging the said cone-shaped member on the valve stem for retaining said valve off said seat, and means for supplying fluid to said housing, said piston having a cone-shaped member on its inner end engaging said lever to disengage said hook to close said valve when pressure on the downstream side of said valve is released.

ARVEN JOHNSON.

REFERENCES CITED

The following references are of record in the file of this patent:

UNITED STATES PATENTS

| Number | Name | Date |
| --- | --- | --- |
| 2,093,015 | Madden | Sept. 14, 1937 |
| 2,130,799 | Hofstetter | Sept. 20, 1938 |
| 2,410,202 | Crawford | Oct. 29, 1946 |
| 2,429,820 | Kean | Oct. 28, 1947 |